United States Patent
Raviv (10) Patent No.: US 11,138,280 B2
(45) Date of Patent: Oct. 5, 2021

(54) COMPUTERIZED SYSTEM AND METHOD FOR EMAIL SEARCH ASSIST OPTIMIZATION

(71) Applicant: VERIZON MEDIA INC., New York, NY (US)

(72) Inventor: Ariel Raviv, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 235 days.

(21) Appl. No.: 16/446,787

(22) Filed: Jun. 20, 2019

(65) Prior Publication Data
US 2020/0401637 A1    Dec. 24, 2020

(51) Int. Cl.
| G06F 7/00 | (2006.01) |
|---|---|
| G06F 16/9535 | (2019.01) |
| H04L 12/58 | (2006.01) |

(52) U.S. Cl.
CPC .......... *G06F 16/9535* (2019.01); *H04L 51/22* (2013.01)

(58) Field of Classification Search
CPC .............................. G06F 16/9535; H04L 51/22
USPC .................................................. 707/600–899
See application file for complete search history.

(56) References Cited

U.S. PATENT DOCUMENTS

| 6,778,979 | B2 | 8/2004 | Grefenstette et al. |
|---|---|---|---|
| 6,820,075 | B2 | 11/2004 | Shanahan et al. |
| 7,685,144 | B1 | 3/2010 | Katragadda |
| 7,805,492 | B1 | 9/2010 | Thatcher et al. |
| 8,423,545 | B2 | 4/2013 | Cort et al. |
| 8,549,412 | B2 | 10/2013 | Brezina et al. |
| 8,566,340 | B2 | 10/2013 | Udupa et al. |
| 8,645,825 | B1 | 2/2014 | Cornea et al. |
| 8,661,002 | B2 | 2/2014 | Smith et al. |
| 8,738,634 | B1 | 5/2014 | Roth et al. |
| 8,996,550 | B2 | 3/2015 | Ko et al. |
| 9,122,376 | B1 | 9/2015 | Brotherston et al. |
| 9,317,585 | B2 | 4/2016 | Heymans et al. |
| 10,095,748 | B2 | 10/2018 | Krinker et al. |
| 2008/0065617 | A1 | 3/2008 | Burke et al. |
| 2009/0177754 | A1 | 7/2009 | Brezinia et al. |
| 2011/0029620 | A1 | 2/2011 | Bonforte |
| 2011/0087969 | A1 | 4/2011 | Hein et al. |
| 2011/0119593 | A1 | 5/2011 | Jacobson et al. |

(Continued)

FOREIGN PATENT DOCUMENTS

| WO | 2014149466 A1 | 9/2014 |
|---|---|---|
| WO | 2015134306 A1 | 9/2015 |

*Primary Examiner* — Isaac M Woo
(74) *Attorney, Agent, or Firm* — James J. DeCarlo; Greenberg Traurig, LLP (57) ABSTRACT

Disclosed are systems and methods for improving interactions with and between computers in content providing, searching and/or hosting systems supported by or configured with devices, servers and/or platforms. The disclosed systems and methods provide a novel framework that provides an optimized ranking methodology for query suggestion and auto-completion tasks that messaging systems can implement and embed into their functionality. The disclosed framework can leverage the mail query logs on a personal level or on the aggregate (e.g., across all or a set of users on a network), and the mailbox content of each user to produce a comprehensive ranking function that generates ranked search suggestions for a mail search query for both person and company entities.

19 Claims, 6 Drawing Sheets

(56) References Cited

U.S. PATENT DOCUMENTS

| | | |
|---|---|---|
| 2011/0289701 A1 | 12/2011 | Kang et al. |
| 2012/0130978 A1 | 5/2012 | Li et al. |
| 2012/0150978 A1 | 6/2012 | Monaco et al. |
| 2012/0150979 A1 | 6/2012 | Monaco |
| 2012/0215861 A1 | 8/2012 | Smith et al. |
| 2013/0262477 A1 | 10/2013 | Monaco et al. |
| 2014/0129569 A1 | 5/2014 | Seeger, III et al. |
| 2014/0280107 A1 | 9/2014 | Heymans et al. |
| 2015/0052203 A1 * | 2/2015 | Karnin .................. H04L 51/16 709/206 |
| 2015/0248411 A1 | 9/2015 | Krinker et al. |

\* cited by examiner

COMPUTERIZED SYSTEM AND METHOD FOR EMAIL SEARCH ASSIST OPTIMIZATION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for a messaging platform that optimizes query suggestion and auto-completion functionality as part of the process of producing efficient and accurate search result rankings.

BACKGROUND

Email search has traditionally been driven by the "re-find" paradigm, where users attempt to retrieve a message they remember having seen before. A known mechanism to assist users in this task is query auto-completion, which has been highly successful in Web search, where it leverages huge logs of queries issued by hundreds of millions of users. However, this approach cannot be applied directly to mail search as personal query logs are small and individualized, mailboxes are not shared and other users' queries are not necessarily generalizable to all, nor are they cross-referenced for other user's queries.

In contrast to Web search, most users rarely search their mailbox, and even when they do, their queries are extremely short, and are mostly focused on the sender, which is either a person or a company. In fact, mail queries are traditionally extremely short (e.g., 1.4 terms on average) and roughly 50% of such queries comprise a name of a person or a company, which is either selected from a suggestion list or is typed by the user. This poses a ranking challenge for email systems that would like to offer relevant person and company entities as search suggestions, since each type has very distinct characteristics.

Traditional query completion mechanisms within the confines of performing a mail search (referred to as "completions" or more generally "suggestions") mainly rely on past interactions between the user and the contact to output and rank a result set, where the prominent factors in performing the ranking are the number of messages sent and received. These factors are passable for ranking person entities, where the correspondence is typically mutual and sporadic. However, as email traffic has shifted dramatically in the last decade from personal interactions to B2C (Business to Consumer) communication, the traditional methods are no longer effective.

SUMMARY

Thus, there is a need for an optimized search ranking framework that is built and applied specifically for message searching. The disclosed systems and methods provide novel search functionality to mail systems (e.g., mail and messaging platforms and applications) by providing suggestion features generated based on both the mailbox content and the query logs. Rather than simply searching for contacts and ranking them based on how often a user interacts with the contacts, as in conventional systems discussed above, the disclosed framework leverages the mailbox content and query logs to produce the search suggestion result set.

Therefore, the disclosed framework provides an optimized and novel ranking methodology for query suggestion and auto-completion tasks that messaging systems can implement and embed into their functionality. The disclosed framework can leverage the mail query logs on a personal level or on the aggregate (e.g., across all or a set of users on a network), and the mailbox content of each user to produce a comprehensive ranking function that fits current users' needs. Traditional systems lack the insight and computational configurations required to leverage user mailbox content and user mailbox query logs in producing ranked autocompleted search suggestion results, and the disclosed systems and methods provide the technical backbone for remedying such shortcomings.

As discussed herein, reference to "messages" can be any type of message that is receivable within any known or to be known messaging or email system. For purposes of this disclosure, reference will be made to electronic mail (email); however, it should not be construed as limiting, as any form of messages can be utilized without departing from the scope of the instant disclosure. The message content comprised within such messages can be any type of message content, such as, but not limited to, text, audio, video, graphics interchange format (GIF) files, digital advertisements, and/or any other type of known or to be known multimedia, or some combination thereof.

In accordance with one or more embodiments, the instant disclosure provides computerized methods for a novel framework for optimizing query suggestion and auto-completion functionality for purposes of producing efficient and accurate search result rankings within a mail environment. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for optimizing query suggestion and auto-completion functionality for purposes of producing efficient and accurate search result rankings.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The instant disclosure provides improved systems and methods for providing a framework to messaging systems, platforms and applications that optimizes query suggestion and auto-completion functionality for purposes of producing efficient and accurate search result rankings from a user's inbox.

By way of background, as mailboxes keep growing, and most users have been shown never to clean up their inboxes, search assist mechanisms, such as query completion, are even more essential to retrieve and access the inbox information in an efficient way. However, query completion algorithms within conventional messaging environments still use traditional contact ranking techniques that were not adopted, nor configured to handle the massive growth of machine-generated content in the email domain.

For example, "amazon", "aliexpress" and "booking.com" are a very common and useful search queries for users hoping to locate a recent delivery notification or an order confirmation. Yet, their associated entities would be ranked very low by these traditional contact ranking algorithms because they rely mainly on mutual interactions.

That is, for example, an "aliexpress" query can be used by users aiming to locate a recent delivery notification or an order confirmation from the Aliepress.com website. Yet, the sender "Aliexpress" would be ranked very low by traditional contact ranking algorithms because: users rarely compose a message to "Aliexpress", they hardly reply to any of its emails, and most users do not even bother to read a large portion of its daily sent messages.

This discordance may lead to unwanted results, where less relevant person entities show up higher than company-related entities in the suggestion pane, making the query completion feature ineffective and inaccurate.

Therefore, the disclosed systems and methods provide a comprehensive ranking framework that generates search suggestions for both person and company entities based on both mailbox content and query logs, which is well suited to the current email traffic and usage patterns.

As evidenced from the disclosure herein, the advantages of a messaging system implementing the disclosed search framework for performing entity ranking and search display are two-fold. First, in the email domain, the content within users' mailboxes is personal, and the disclosed framework accounts for both personal and global attributes (e.g. personal term frequency and global query frequency). Thus, the disclosed mechanisms utilize suggestions drawn from joint queries logs of many users while validating their relevance to the individual user.

Secondly, the disclosed framework goes beyond frequency and co-occurrence measures and combines various types of information, such as, but not limited to, the user actions, the type of message (e.g., sent, received, "foldered"), its recency, each field's importance, and the like. These are specific to the email domain, and thereby extend mechanisms for term scoring in identifying and ranking search suggestions.

As discussed in more detail below at least in relation to FIG. 6, according to some embodiments, information associated with, derived from, or otherwise identified from, during or as a result of a message search, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Figure 1:
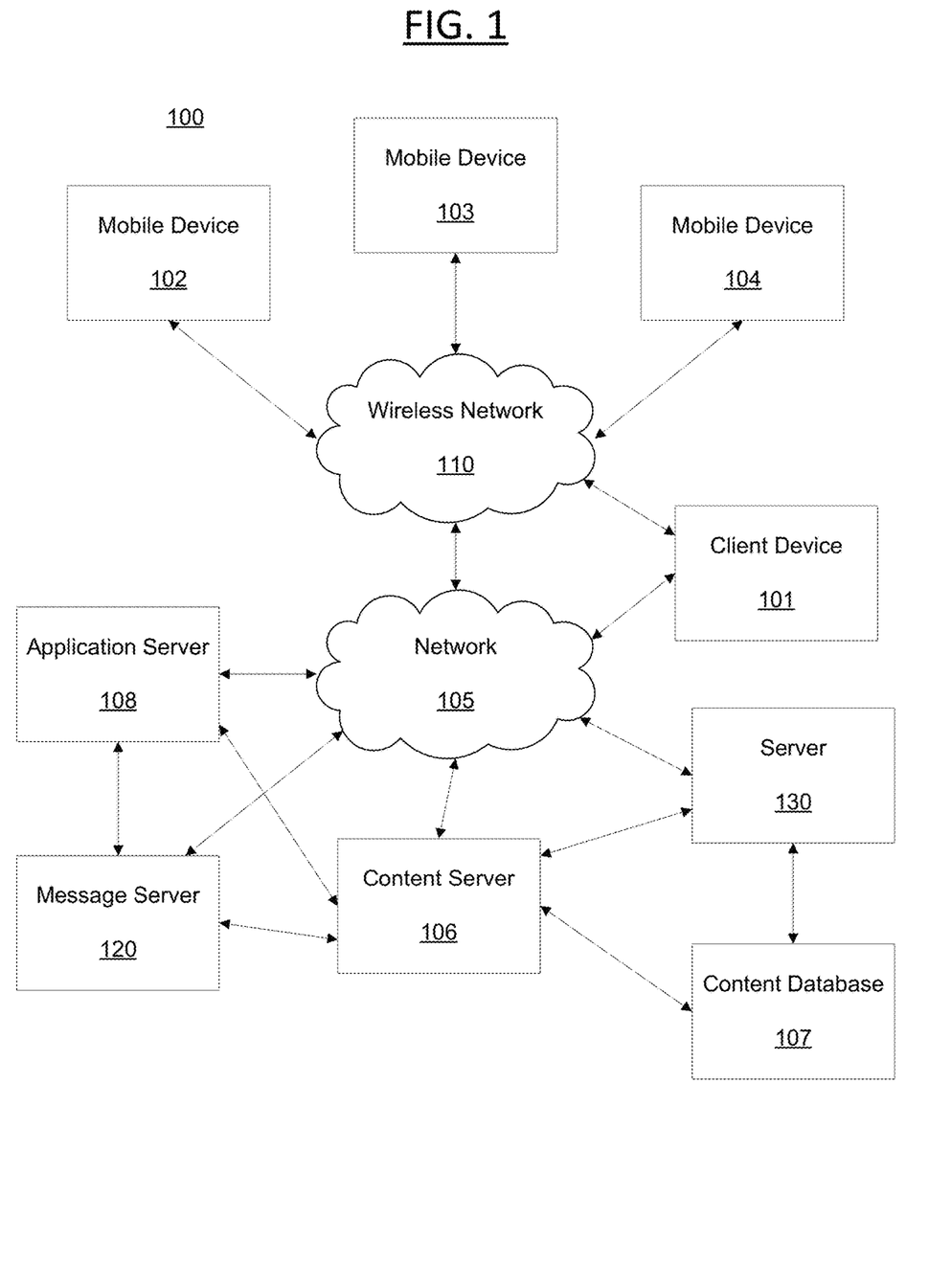
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MIMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
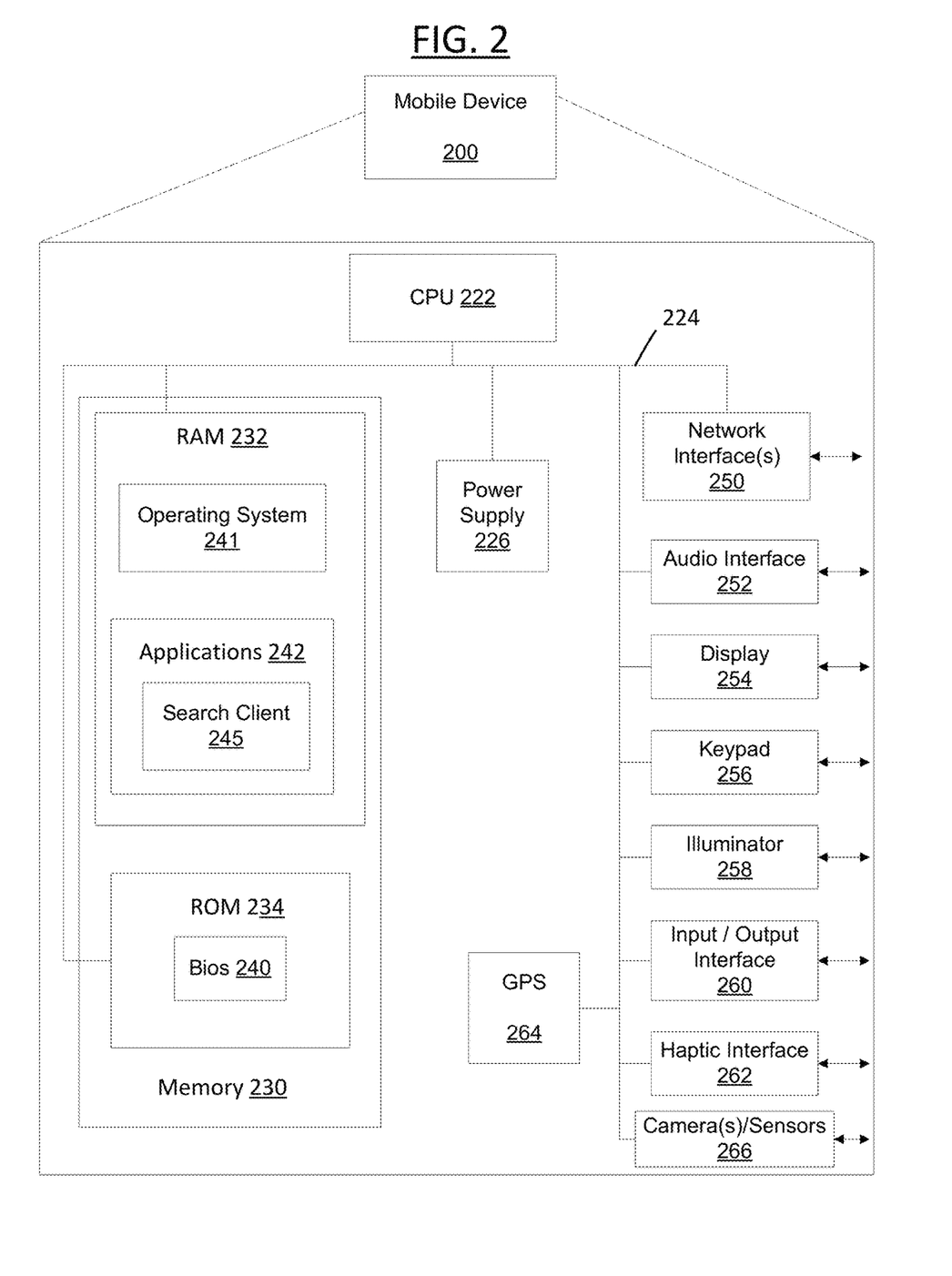
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
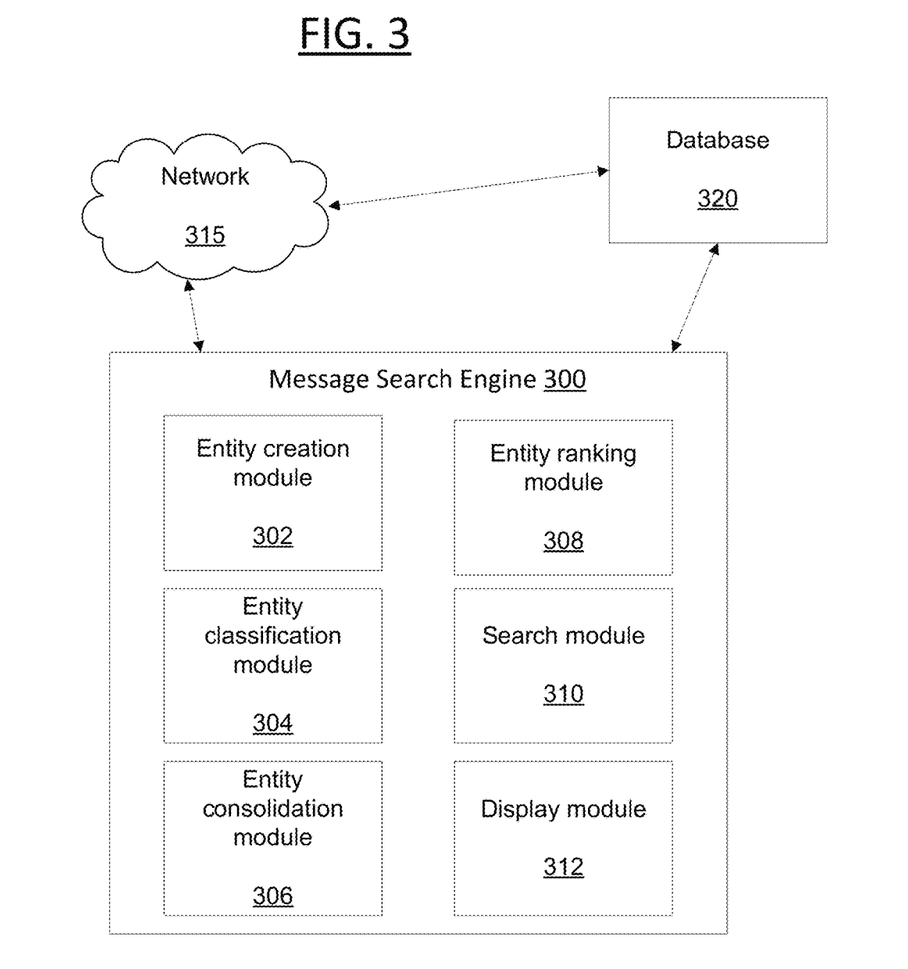
FIG. 3 is a block diagram illustrating components of an exemplary system in accordance with embodiments of the present disclosure.

FIG. 3 is a block diagram illustrating the components for performing the systems and methods discussed herein. FIG. 3 includes message search engine 300, network 315 and database 320. The message search engine 300 can be a special purpose machine or processor and could be hosted by an application server, content server, social networking server, web server, email server, search server, content provider, third party server, user's computing device, and the like, or any combination thereof.

According to some embodiments, message search engine 300 can be embodied as a stand-alone application that executes on a user device. In some embodiments, the message search engine 300 can function as an application installed on the user's device, and in some embodiments, such application can be a web-based application accessed by the user device over a network. In some embodiments, the message search engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and other mediums that display digital content information in whole or in part (e.g., a map), and the content included therein, including, text, audio, images, multimedia, RSS feed information, can be used without departing from the scope of the instant application, which can thereby be communicated and/or accessed and processed by the message search engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message search engine 300, and the database of stored resources 320. Indeed, as illustrated in FIG. 3, the message search engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message search engine 300, and includes entity creation module 302, entity classification module 304, entity consolidation module 306, entity ranking module 308, search module 310 and display module 312. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
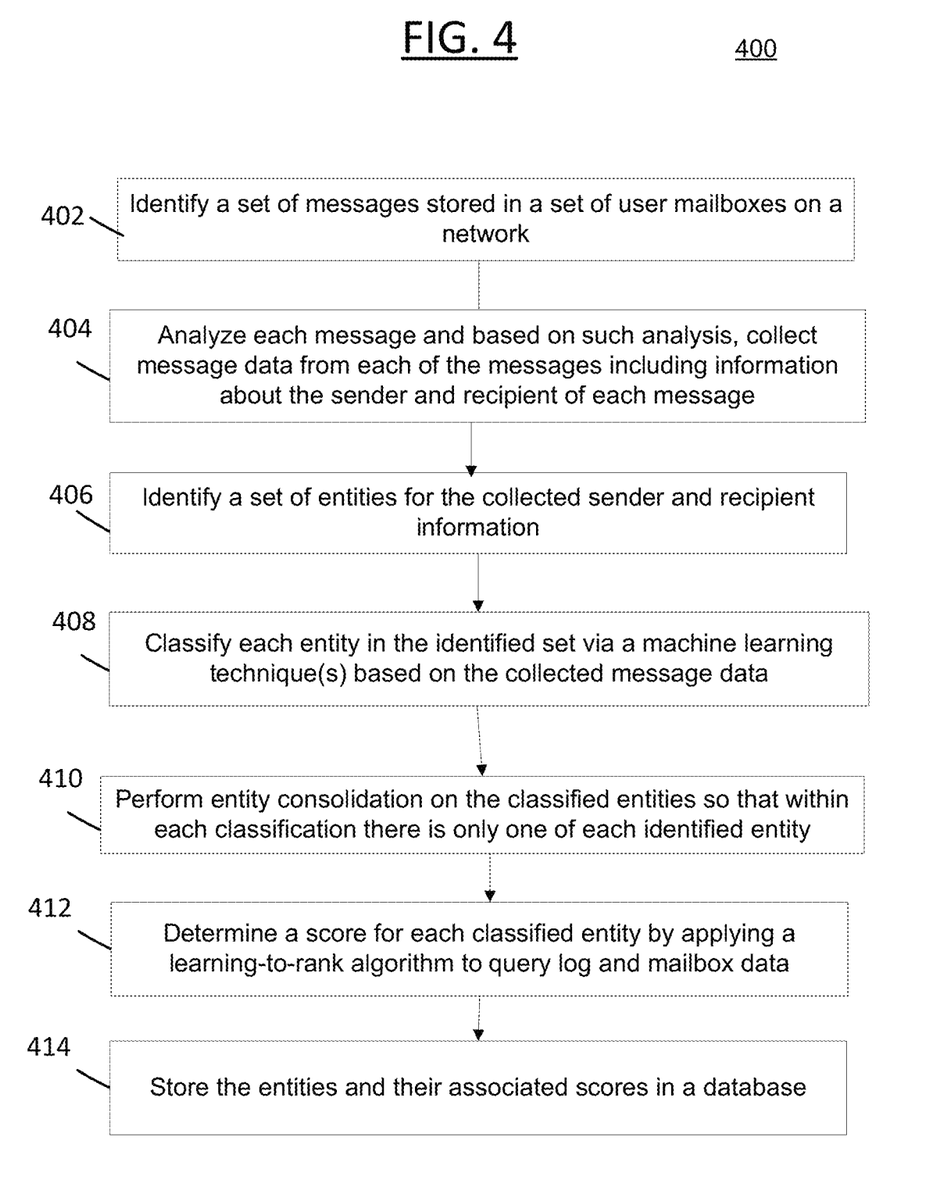
FIG. 4 is a block diagram illustrating an exemplary data flow in accordance with some embodiments of the present disclosure.
Figure 5:
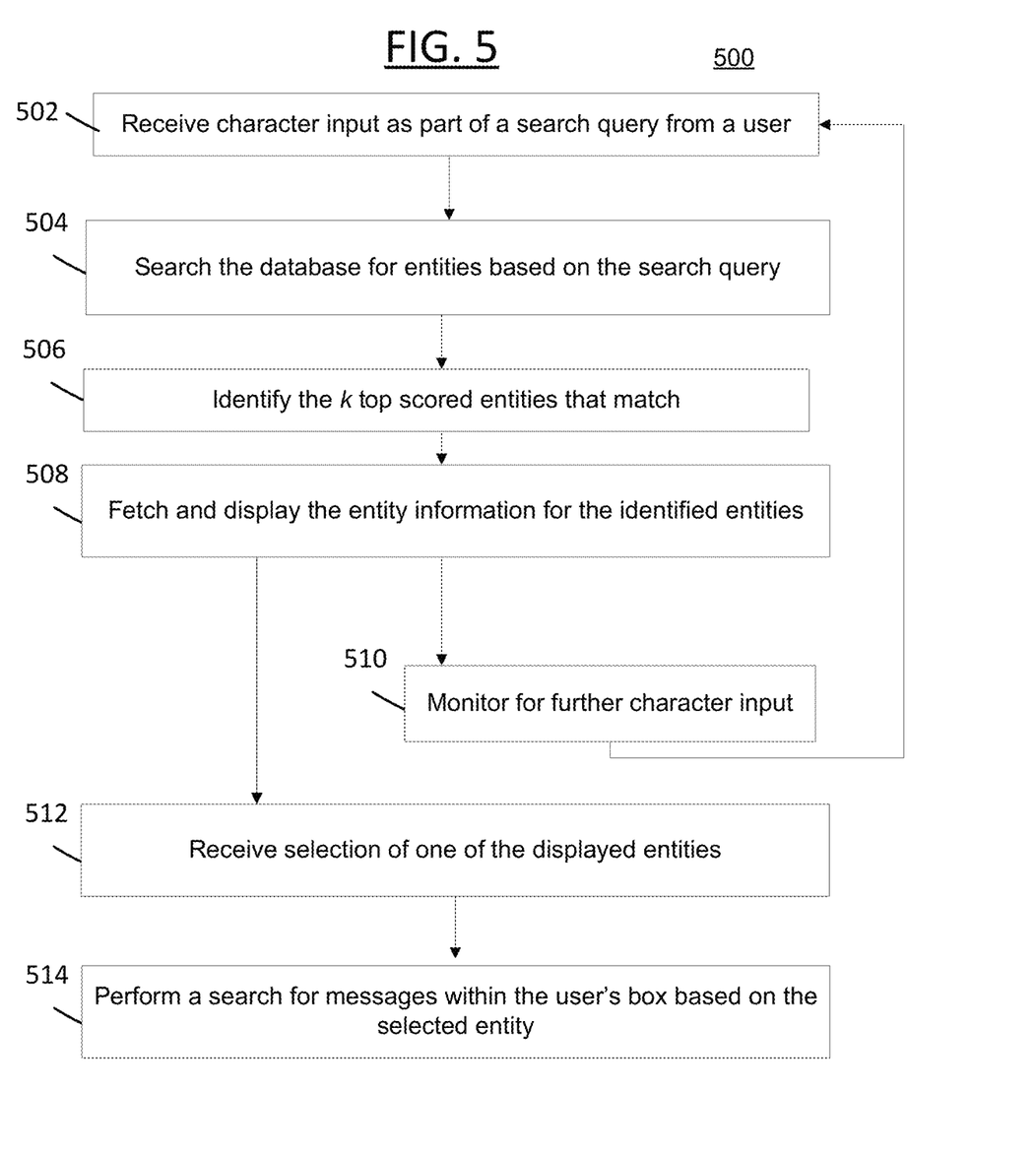
FIG. 5 is a block diagram illustrating an exemplary data flow in accordance with some embodiments of the present disclosure.

Turning to FIGS. 4 and 5, Processes 400 and 500 provides an example data flow that details embodiments of the disclosed framework for a comprehensive ranking framework that is used to generate search suggestions for a mail search query for both person and company entities based on both mailbox content and query logs. Process 400 provides embodiments for building the database from message information on a network upon which a user's search query (e.g., a prefix, as discussed below in relation to Process 500 of FIG. 5) can be compared to provide the ranked results. Process 400 can be performed in an online environment or offline.

According to some embodiments of Process 400 of FIG. 4, Steps 402-406 of Process 400 are performed by the entity creation module 302 of the message search engine 300; Step 408 is performed by the entity classification module 304; Step 410 is performed by the entity consolidation module 306; Steps 412-414 are performed by the entity ranking module 308.

Step 402 begins Process 400 with the identification of a set of messages to be analyzed. In some embodiments, the set of messages can be those associated with a user's inbox, and in some embodiments, the set of messages can be those associated with an aggregate of user inboxes—e.g., inboxes of users associated with an email domain, message platform, messaging service and the like. In some embodiments, the set of messages can be across domains or messaging platforms. In some embodiments, the set of the messages can be messages sent/received within a predetermined time period, messages associated with a geographic location, messages of a particular type, messages that include a type of content or message context, messages that have been responded to or forwarded to other users, or any other type of activity performed on sent/received messages (e.g., tagged, deleted or otherwise categorized within a user's inbox), and the like, or some combination thereof.

In Step 404, each message identified in Step 402 is analyzed and the message data included in those messages can be collected (extracted, retrieved or otherwise identified). According to some embodiments, the analysis involves parsing each message's data and metadata and identifying the data included in the header, subject line and/or message body.

The message data identified from the analysis that is collected can include, but is not limited to, the name (or identifier), type and address of the sender and/or recipient, phone number, IP address, location (that is referenced in the message, of the sender/recipient), context, type and category of the content in the message, tags or other identifiers or classifiers applied to or embedded within the message, characteristics/features of the content (e.g., words in the subject line and message body, and body character length and number of URLs occurring in the body), types of messages (e.g., user generated or machine generated from a template), attributes/features from the address of the sender/recipient (e.g., which domain, subdomain and/or sub-name, and the like), behavioral features indicative of the actions taken on and/or to generate the messages (e.g., the sender's outgoing activity such as weekly and monthly volumes of sent messages, histogram of the number of recipients in their messages, which action was performed on the message, if any, when it was received by a recipient, and the like), temporal behavioral features associated with the message (e.g., a frequency of specific actions over a period of time—for example, whether a sender sends more than x messages in an hour), and the like, and/or some combination thereof.

According to some embodiments, Step 404 can also involve identifying information about the sender/recipient of each message using this data to retrieve additional or supplemental information from other online sources such as, but not limited to, online directories, social networking websites, web pages, results pages found by search engines, and the like. Thus, additional information about the senders/recipients can be identified and utilized as part of the entity information, as discussed below.

Thus, in Step 406, a set of entities is identified from the sender/recipient information collected from the identified set of messages. The entities can be defined by the message data collected from Step 404. In some embodiments, this involves generating an entity structure that is later stored in a database, as discussed in more detail below in relation to Step 414 and FIG. 5.

In Step 408, each of the set of entities are classified based on each entities' respective message data. As discussed herein, an entity can be classified as either a person (human) or company (machine), and such processing can be performed via any known or to be known machine-learning classification algorithm, technique or mechanism, including, but not limited to, linear classifiers (e.g., logistic regression, naive Bayes classifier), support vector machines, decision trees, boosted trees, random forest, neural networks, nearest neighbor algorithm, and the like.

Thus, in Step 408, a machine learning classifier can receive message data for an entity as input, and determine its classification (or category) as output. As discussed above, the classification involves analysis of not only the identifying information of the sender/recipient, but also the message data associated with the sender/recipient: the content features, address features, behavioral features, temporal behavioral features, information derived from external sources (for example, a Facebook® profile or Wikipedia® page that matches an entity's name), and other forms of latent or overt features/attributes associated with the sender/recipient, or some combination thereof.

In Step 410, entity consolidation is performed so that within each classification, there is only one of each identified entity, and that one entity structure has all the message data included therein. In some embodiments, the consolidation ensures that an entity is not classified as both a person or company. In Step 410, as discussed herein, engine 300 integrates message data for an entity when there are multiple entries for the entity into a single entity structure. For example, if business (or machine) entity "Amazon" has two separate entries, where each entity has different information, then they will be merged into a single entity structure that is inclusive of all the message data.

In other words, Process 400 (Steps 402-408) may create multiple virtual entities for the same physical entity. For instance, if a person has several email accounts, each account will trigger the creation of different entity. This can have an even stronger impact on company entities, as companies tend use multiple email accounts regularly for different business purposes, and the number of such accounts can be quite large. Hence, a consolidation phase is needed in order to combine entities that were fragmented in Steps 402-408.

Step 410 can perform such consolidation by multiple techniques, which can range from manually-curated heuristic rules, such as merging entities by their name or address information, to complex clustering methods that take into account additional features, such as the rate of correspondence, the content of messages, and the like. The consolidation functionality implemented in Step 410 by engine 300 can also leverage global information that was aggregated across user mailboxes. This type of information is especially beneficial for the resolution of company entities, which are typically prevalent among large number of users.

Thus, according to some embodiments, Step 410 can involve analyzing entity information (e.g., sender/recipient identifier, address or name, for example), for each identified entity from Step 406, and upon determining that there is more than one entity with the same information, engine 300 can automatically consolidate (or merge) the entity structures into a single entity structure. According to some embodiments, the consolidation can be performed by engine 300 executing software defined by any known or to be known computational analysis technique or algorithm, such as, but not limited to, cluster analysis, data mining, Bayesian network analysis, Hidden Markov models, artificial neural network analysis, logical model and/or tree analysis, and the like, that can determine matches between two entity structures and merge them into a single entity structure.

In Step 412, a score for each classified (and now consolidated, if necessary) entity is determined. The score for each entity is based on the combined features from both the query logs within a mailbox (or mailboxes) and the mailbox sources. Two main factors account for the entity score:

First (within a mailbox source): an entity's prevalence in important messages with respect to a user's mailbox. The message importance is measured by the number of actions taken by a user, such as, but not limited to, read, starred, forwarded, deleted, as well as the recency of those actions. The association of an entity to a given message can be determined by the occurrence of one of its email addresses in the From/To/Cc fields of the message, and can also take into account the frequency of the entity name (or names) in the message subject or body.

Second (from the query logs): an entity's likelihood as a query, with respect to a user's past queries as well as the joint query log of an aggregate of users (e.g., users on a network or within a specific mail domain). The likelihood of a query can be measured by its frequency in the query logs, accounting for recency as well. In some embodiments, the likelihood of a query measure can be further refined to use the joint query log of "similar users", where similarity of users can be based on their demographic or geographic traits, as well as mailbox content or activity in a mail domain. The association of an entity to a given query can be determined by the occurrence of one of its names or partial names in the query text.

Given the features defined above, Step 412 can involve engine 300 executing an automatic learning-to-rank algorithm on the query log and mailbox data. According to some embodiments, the learning-to-rank algorithm is applied in order to tune the weights associated with each of the data features derived from the query logs and mailbox sources.

In a non-limiting example, engine 300 can execute AROW, an online variant of SVMRank, which learns a linear weight vector through pairwise comparisons between the relevant candidate and other top-ranked candidates for each query. The model can be tuned by a retrospective analysis over past data or using an online approach. This, therefore, would provide a weighted balance between the query log and mailbox data for an entity which provides a score indicating how important the entity actually is within a user's inbox.

By way of a non-limiting example, if an entity is a business (machine, as classified in Step 408), and a user never searched for the entity (as indicated from the query log data) but has a high volume of emails in his/her inbox (from the mailbox source), then the query log data may be weighted higher and factor more in determining a lower score for the entity, as the user may not be interested in searching for messages to/from or in reference to the entity.

In Step 414, once the entities are scored, the entities and their corresponding scores for each user are then stored in a dedicated database (that is associated with a mail platform, e.g., Yahoo! Mail®). The storage can be within a look-up table (LUT), as a key value pair (e.g., HashMap) or a digital tree (e.g., Trie), such that an entity's score and identifier (and in some embodiments, the message data for the entity structure) are stored in an associated manner for efficient identification and retrieval.

Thus, as discussed in in relation to FIG. 5, given a prefix entered by the user (e.g., a threshold satisfying number of characters), the k top-scored entities for that user that match the prefix are fetched and displayed to the user.

Turning to FIG. 5, according to some embodiments of Process 500 of FIG. 5, Steps 502-506 and 510-514 of Process 500 are performed by the search module 310 of the message search engine 300; Step 508 is performed by the display module 312.

Process 500 begins with Step 502 where a user enters a search query into a search dialog box on a mail application user interface (UI). As the query is entered, engine 300 analyzes the number of characters entered until a threshold number of characters is entered. Upon satisfaction of the threshold, the search query is determined to constitute a "prefix" that can be searched and autocompleted according to the disclosed framework. For example, the threshold can dictate that at least 3 characters have been entered.

In Step 504, upon a search prefix being determined, the database entity information for the user is accessed and searched based on the search prefix. According to some embodiments, the search analyzes the entity information in the database and identifies the k top scored entities that match. Step 506. That is, each of the entities that match the prefix are identified and a threshold number (k) of entities are identified. These entities are the entities that have the top k scores (as determined from Step 412 of FIG. 4, as discussed above).

For example, upon a user entering a search prefix "ama", the search identifies the top 3 entities for the user in the database—i.e., the entities with the highest scores. For example, the results can include, and be ordered as follows: "amanda@email.com"; "amal@email.com" and "info@amazon.com".

Continuing with Process 500, Step 508 involves fetching the entity information for these k identified entities and displaying them as query suggestions or auto-completion suggestions. As understood by those of skill in the art, the displayed suggestions can be displayed as an ordered drop down menu to the dialog box used to enter the prefix. In Step 512, the user can select one of the displayed suggestions, whereby in Step 514, engine 300 can perform a search of the user's mailbox based on the selected suggestion.

In Step 510, engine 300 continuously monitors for additional query character entries, such that upon identifying additional characters, the prefix is updated and the search of Step 504 is re-performed. This recursive processing can be performed for each additional entry input by the user beyond the prefix threshold amount of characters.

Figure 6:
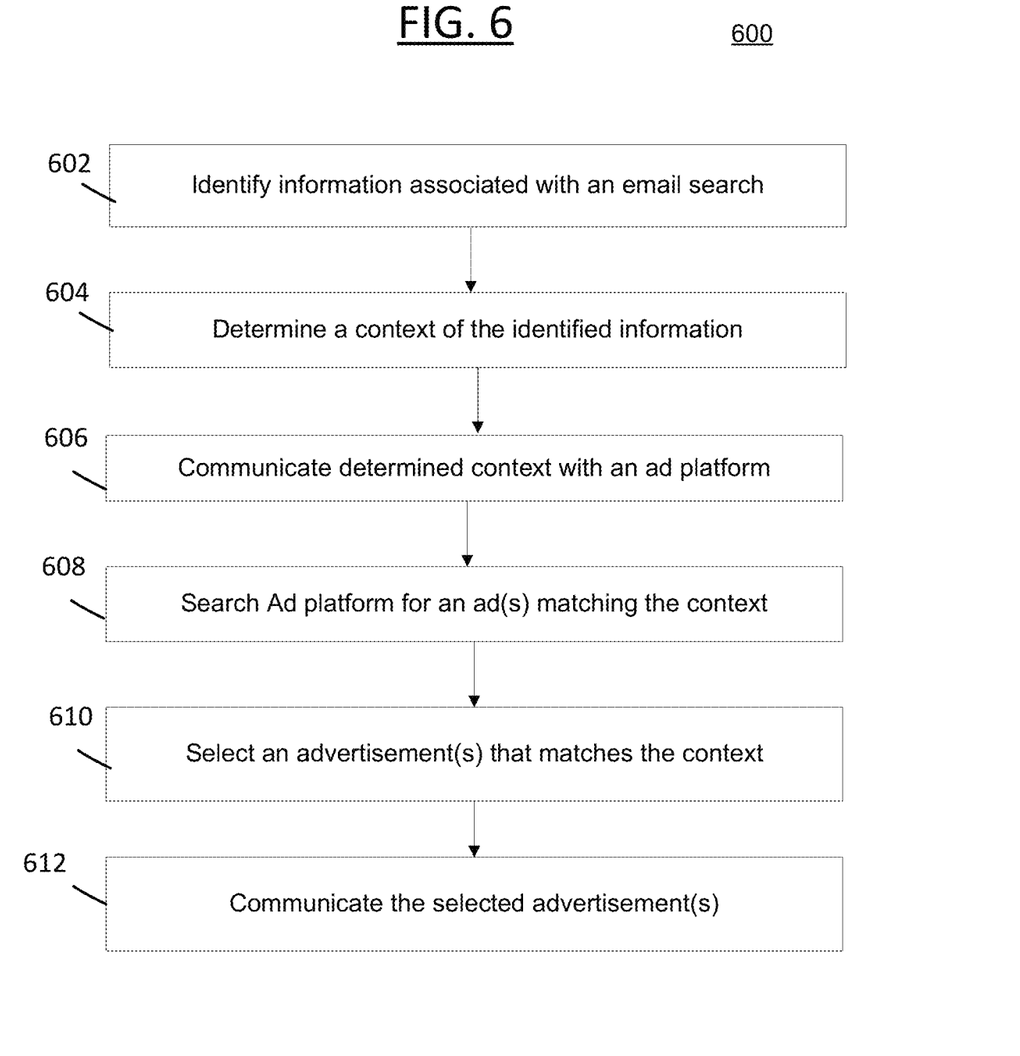
FIG. 6 is a block diagram illustrating an exemplary data flow in accordance with some embodiments of the present disclosure.

FIG. 6 is a work flow process 600 for serving related digital media content based on the information associated with an email search query within a messaging system, as discussed above in relation to FIGS. 3-5. In some embodiments, the content can be associated with or comprising advertisements (e.g., digital advertisement content). Such content can include or be based upon, but is not limited to, information associated with an object a user received in his/her mailbox (e.g., a message or digital content included in a delivered message, for example), a context of a user's activity on a network that caused the delivery, and the like (e.g., how did the user interact with a message or message information, and/or some combination thereof). Such information can be referred to as "message information" for reference purposes only.

Process 600 discusses embodiments for engine 300 to provide functionality for mail systems to partner with third party entities enabling the entities to provide digital content for display within an inbox of a user based on the message information determined, discovered, derived or otherwise identified from Process 400, as discussed above.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, message information is identified. As discussed above, the message information can be based any of the information utilized, determined and/or generated from/during the mail search mechanisms outlined above with respect to FIGS. 3-5. For purposes of this disclosure, Process 600 will refer to single search; however, it should not be construed as limiting, as any number of searches and/or identified entities or messages used can form such basis, without departing from the scope of the instant disclosure.

In Step 604, a context is determined based on the identified message information. This context forms a basis for serving content related to the message information. For example, the user entered a search for "amaz" and a top ranked result, which the user selected, was for the sender "Amazon". Thus, the context of the message, according to Step 604, can be related to "e-commerce" or "online shopping". This context can be leveraged in order to identify digital content related to additional deals for the user from Amazon® or other online commercial entities.

In some embodiments, the identification of the context from Step 604 can occur before, during and/or after the analysis detailed above with respect to Processes 400 and 500, or it can be a separate process altogether, or some combination thereof.

In Step 606, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 608, the server searches the database for a digital content item(s) that matches the identified context. In Step 610, a content item is selected (or retrieved) based on the results of Step 608. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a message, text, media, content or object item. Step 612. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
   identifying, via a computing device over a network, a set of messages associated with a user mailbox hosted by a mail platform;
   analyzing, via the computing device, each message of the set, and based on said analysis, identifying contact information for each message;
   further analyzing, via the computing device, each message based on said contact information, and based on said analysis, identifying message data within each message that corresponds to each contact;
   identifying, via the computing device, a set of entities based on said contact information;
   classifying, via the computing device, each entity in said set based on said message data;
   determining, via the computing device, a score for each classified entity based upon query log data of the mail platform and mailbox data within said user mailbox;
   storing, via the computing device, entity information in a database associated with said user mailbox, said entity information comprising contact information for each entity and each entity's determined score stored as an associated pair;
   receiving, by the computing device, a search query;
   searching, by the computing device, said database based on said search query, said search comprising analyzing said stored entity information and identifying a predetermined number of entities matching said search query, said predetermined number indicating a top number of entities based on their respective determined scores; and
   fetching and communicating, by the computing device, over said network, said predetermined number of entities, said communication causing said predetermined number of entities to be displayed as an ordered list of selectable search suggestions.

2. The method of claim 1, further comprising:
   receiving a selection of a displayed search suggestion; and
   searching said user mailbox based on said selection.

3. The method of claim 2, further comprising:
   causing communication, over the network, of information related to said selection to a third party platform to obtain a digital content item comprising third party provided digital content associated with said information;
   receiving, over the network, said digital content item; and
   communicating said digital content item to said user for display in association with a result of said search.

4. The method of claim 1, wherein said stored entity information is specific to each user's mailbox.

5. The method of claim 1, wherein said scoring further comprises:
   analyzing said query log data, and based on said analysis, determining an activity value of a user related to searches for each entity;
   analyzing said mailbox data, and based on said analysis, determining an activity value of the user related to correspondence with each entity;
   determining, based on said search activity value and said correspondence activity value, a weight of said query log data for each entity; and
   determining, based on said search activity value and said correspondence activity value, a weight of said mailbox data for each entity.

6. The method of claim 5, wherein said score determination for each entity is based on said determined weights.

7. The method of claim 1, wherein said classification comprises determining whether said entity is a person or company, wherein said person corresponds to a human sender of a message and said company corresponds to a machine generated message.

8. The method of claim 1, further comprising:
   analyzing each identified entity;
   determining an existence of more than one of the same entity; and
   merging each existence into a single entity.

9. The method of claim 1, further comprising:
   retrieving, over the network, said message data from external sources based on said contact information, said retrieval comprising searching and identifying said message data based on a query comprising said contact information.

10. The method of claim 9, wherein said external sources are selected from a group a network sources external to said mail platform consisting of:
    online directories, social networking websites, web pages, and results pages found by search engines.

11. The method of claim 1, wherein said contact information comprises at least one of a name or address of a sender or recipient of a message.

12. The method of claim 1, wherein said message data comprises data selected from a group consisting of: context, type and category of content in a message, tags or other identifiers or classifiers applied to or embedded within a message, characteristics or features of the content, type of a message, attributes from an address of the contact, behavioral features indicative of an action taken on and/or to generate a message, and temporal behavioral features associated with a message.

13. The method of claim 1, wherein said set of messages are identified from a plurality of user mailboxes.

14. A non-transitory computer-readable storage medium tangibly encoded with computer-executable instructions, that when executed by a processor associated with a server, performs a method comprising the steps of:
    identifying, via the computing device over a network, a set of messages associated with a user mailbox hosted by a mail platform;
    analyzing, via the computing device, each message of the set, and based on said analysis, identifying contact information for each message;
    further analyzing, via the computing device, each message based on said contact information, and based on said analysis, identifying message data within each message that corresponds to each contact;

identifying, via the computing device, a set of entities based on said contact information;

classifying, via the computing device, each entity in said set based on said message data;

determining, via the computing device, a score for each classified entity based upon query log data of the mail platform and mailbox data within said user mailbox;

storing, via the computing device, entity information in a database associated with said user mailbox, said entity information comprising contact information for each entity and each entity's determined score stored as an associated pair;

receiving, by the computing device, a search query;

searching, by the computing device, said database based on said search query, said search comprising analyzing said stored entity information and identifying a predetermined number of entities matching said search query, said predetermined number indicating a top number of entities based on their respective determined scores; and fetching and communicating, by the computing device, over said network, said predetermined number of entities, said communication causing said predetermined number of entities to be displayed as an ordered list of selectable search suggestions.

15. The non-transitory computer-readable storage medium of claim 14, further comprising:

receiving a selection of a displayed search suggestion; and searching said user mailbox based on said selection.

16. The non-transitory computer-readable storage medium of claim 14, wherein said scoring further comprises:

analyzing said query log data, and based on said analysis, determining an activity value of a user related to searches for each entity;

analyzing said mailbox data, and based on said analysis, determining an activity value of the user related to correspondence with each entity;

determining, based on said search activity value and said correspondence activity value, a weight of said query log data for each entity; and determining, based on said search activity value and said correspondence activity value, a weight of said mailbox data for each entity, wherein said score determination for each entity is based on said determined weights.

17. The non-transitory computer-readable storage medium of claim 14, further comprising:

analyzing each identified entity;

determining an existence of more than one of the same entity; and merging each existence into a single entity.

18. A computing device comprising:

a processor; and a non-transitory computer-readable storage medium for tangibly storing thereon program logic for execution by the processor, the program logic comprising:

logic executed by the processor for identifying, over a network, a set of messages associated with a user mailbox hosted by a mail platform;

logic executed by the processor for analyzing each message of the set, and based on said analysis, identifying contact information for each message;

logic executed by the processor for further analyzing each message based on said contact information, and based on said analysis, identifying message data within each message that corresponds to each contact;

logic executed by the processor for identifying a set of entities based on said contact information;

logic executed by the processor for classifying each entity in said set based on said message data;

logic executed by the processor for determining a score for each classified entity based upon query log data of the mail platform and mailbox data within said user mailbox;

logic executed by the processor for storing entity information in a database associated with said user mailbox, said entity information comprising contact information for each entity and each entity's determined score stored as an associated pair;

logic executed by the processor for receiving a search query;

logic executed by the processor for searching said database based on said search query, said search comprising analyzing said stored entity information and identifying a predetermined number of entities matching said search query, said predetermined number indicating a top number of entities based on their respective determined scores;

logic executed by the processor for fetching and communicating, over said network, said predetermined number of entities, said communication causing said predetermined number of entities to be displayed as an ordered list of selectable search suggestions.

19. The computing device of claim 18, further comprising:

logic executed by the processor for receiving a selection of a displayed search suggestion; and logic executed by the processor for searching said user mailbox based on said selection.

* * * * *